United States Patent
Carr et al.

(10) Patent No.: US 11,719,666 B2
(45) Date of Patent: Aug. 8, 2023

(54) SYSTEM COMPRISING PH/ORP ELECTRODES WITH IMPROVED ANTI-POISONING CHARACTERISTICS

(71) Applicant: ABB Schweiz AG, Baden (CH)

(72) Inventors: Benjamin Carr, Stroud (GB); Kenton Knight, Gloucester (GB)

(73) Assignee: ABB Schweiz AG, Baden (CH)

(*) Notice: Subject to any disclaimer, the term of this patent is extended or adjusted under 35 U.S.C. 154(b) by 120 days.

(21) Appl. No.: 17/024,722

(22) Filed: Sep. 18, 2020

(65) Prior Publication Data
US 2021/0088466 A1 Mar. 25, 2021

(30) Foreign Application Priority Data

Sep. 19, 2019 (EP) ..................................... 19198439

(51) Int. Cl.
*G01N 27/403* (2006.01)
*G01N 27/30* (2006.01)

(52) U.S. Cl.
CPC ......... *G01N 27/301* (2013.01); *G01N 27/302* (2013.01); *G01N 27/4035* (2013.01)

(58) Field of Classification Search
CPC ............... G01N 27/301; G01N 27/302; G01N 27/4035; G01N 27/401
See application file for complete search history.

(56) References Cited

U.S. PATENT DOCUMENTS

| | | | |
|---|---|---|---|
| 4,112,352 A | 9/1978 | Barben, II | |
| 4,177,126 A * | 12/1979 | Imaki | G01N 27/301 |
| | | | 204/435 |
| 4,279,728 A * | 7/1981 | Horii | G01N 27/4035 |
| | | | 204/400 |
| 4,360,415 A * | 11/1982 | Brezinski | G01N 27/4035 |
| | | | 204/406 |
| 4,913,793 A * | 4/1990 | Leonard | G01N 27/301 |
| | | | 204/435 |
| 6,416,653 B1 * | 7/2002 | Barben, II | G01N 27/401 |
| | | | 205/787.5 |
| 6,495,012 B1 * | 12/2002 | Fletcher | G01N 27/301 |
| | | | 204/420 |
| 9,513,248 B2 * | 12/2016 | Tower, III | G01N 27/4035 |
| 2002/0189943 A1 | 12/2002 | Fletcher et al. | |
| 2009/0101524 A1 * | 4/2009 | Woodward | G01N 27/302 |
| | | | 204/406 |
| 2009/0321280 A1 | 12/2009 | Kimble | |
| 2011/0048971 A1 | 3/2011 | Bower et al. | |

FOREIGN PATENT DOCUMENTS

| | | |
|---|---|---|
| CN | 1447917 A | 10/2003 |
| CN | 107238641 A | 10/2017 |
| GB | 2421578 A | 6/2006 |
| GB | 2469650 A | 10/2010 |

\* cited by examiner

*Primary Examiner* — Alexander S Noguerola
(74) *Attorney, Agent, or Firm* — Leydig, Voit & Mayer, Ltd.

(57) ABSTRACT

A reference electrode system for a pH-sensor system includes: a first junction having a membrane with a sealed side; a reference electrode, the reference electrode and/or an electrically conducting wire of the reference electrode being covered completely except for an end portion of the reference electrode, by a sleeve; and a tube that is arranged, at least partly, around the reference electrode, the electrically conducting wire, and the sleeve, the tube having a closed end which is arranged near the end portion of the reference electrode.

11 Claims, 3 Drawing Sheets

SYSTEM COMPRISING PH/ORP ELECTRODES WITH IMPROVED ANTI-POISONING CHARACTERISTICS

CROSS-REFERENCE TO PRIOR APPLICATION

Priority is claimed to European Patent Application 19 198 439.2, filed on Sep. 19, 2019, the entire disclosure of which is hereby incorporated herein by reference.

FIELD

The invention relates to the field of pH-sensors, particularly for measuring a pH-value of a medium, such as a fluid. The invention relates to a reference electrode system, a pH-sensor system comprising this reference electrode system, and to a method for manufacturing a pH-sensor system, and to a use of a reference electrode system.

BACKGROUND

In many cases, pH-sensors are used for measuring a pH-value of a medium, for instance of a fluid. Many types of pH-sensors, however, may be imperilled by ions penetrating to the reference electrode, thus reducing the lifetime of these pH-sensors. These ions are often referred to as "poisoning" ions.

SUMMARY

In an embodiment, the present invention provides a reference electrode system for a pH-sensor system, the reference electrode system comprising: a first junction comprising a membrane with a sealed side; a reference electrode, wherein the reference electrode and/or an electrically conducting wire of the reference electrode is covered completely except for an end portion of the reference electrode, by a sleeve; and a tube that is arranged, at least partly, around the reference electrode, the electrically conducting wire, and the sleeve, the tube having a closed end which is arranged near the end portion of the reference electrode.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
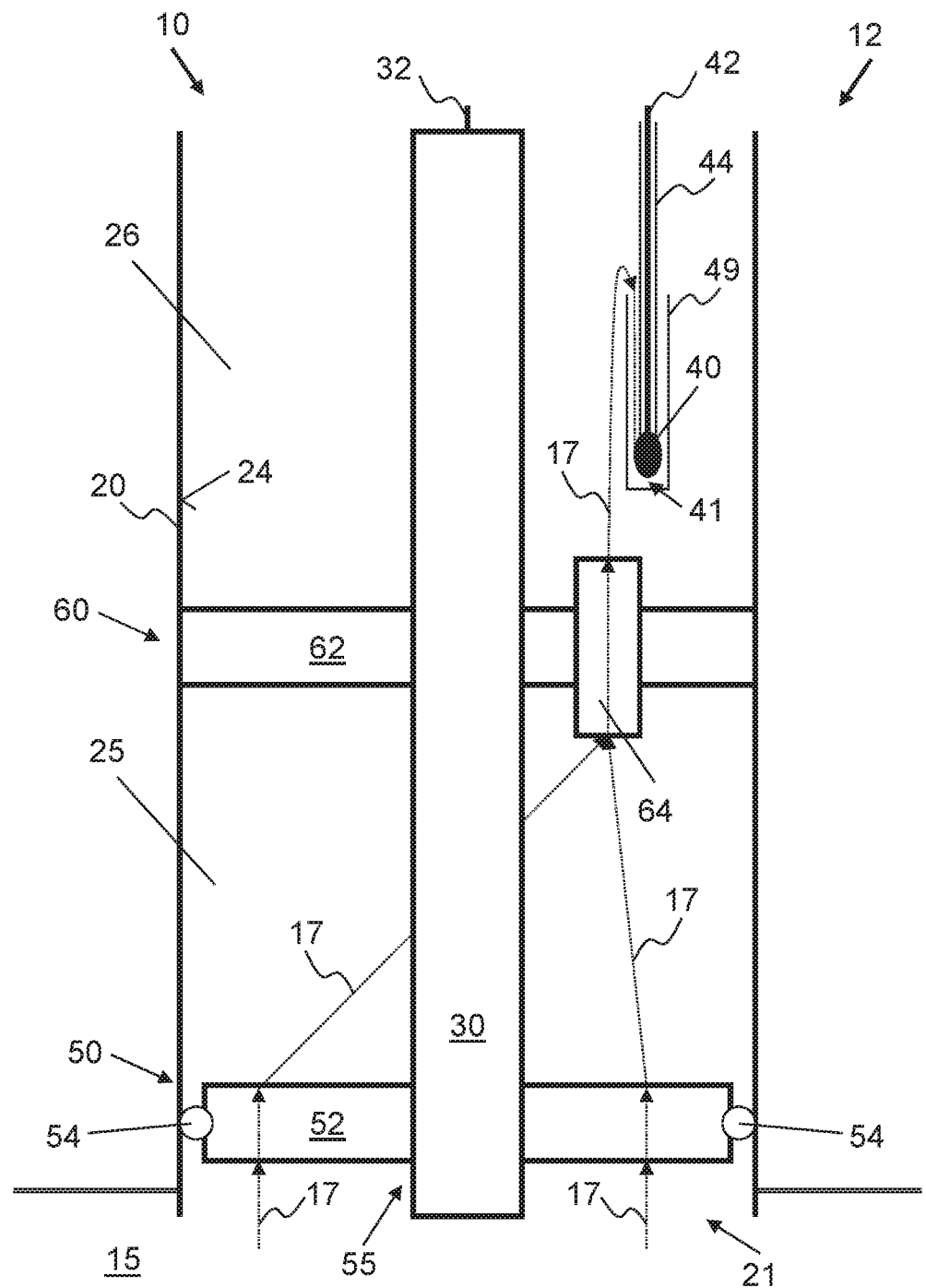
FIG. 1 schematically shows a sectional view of a pH-sensor system according to an embodiment.

In an embodiment, the present invention provides an improved reference electrode system.

One aspect relates to a reference electrode system for a pH-sensor system. The reference electrode system comprises a first junction, comprising a membrane with a sealed side, and a reference electrode, at least partly covered by a sleeve.

A reference electrode of a pH/ORP system (ORP: Oxidation-Reduction Potential) may comprise two components, a measuring electrode and a reference electrode. In many systems, the pH-potential is generated within the measuring electrode, and the reference potential is generated within the reference electrode. The reference electrode may comprise an electrolyte. The electrolyte may be a gel and/or a liquid saturated KCl solution. The difference of the pH vs. the reference potential may be measured using an input with a high impedance, e.g. greater than 1 MOhm.

Sensor failures may be caused, for instance, due to one of these components failing. For illustrative reasons, the reference may be assumed to be a silver/silver chloride (Ag/AgCl) reference electrode. In this case, one cause of a failure of the reference electrode may be "poisoning" ions from a process to be measured: At least some of these poisoning ions may permeate into the reference electrode, and the ions may react with the Ag+, then. This may cause the stable reference potential to change, thus effecting the reading. At least in some cases, this reaction may, e.g., deposit material onto the reference or erode the reference, causing the electrode to decay or even to stop working completely. One strategy to cope with this may be to impede the path of ions from the process to the reference element.

One aspect may include to provide, as a part of the reference electrode system, a first junction, which comprises a membrane with a sealed side. The membrane may comprise or consist of a porous junction. One example material of the porous junction may be polytetrafluoroethylene (PTFE) or any other material in the range of ion-porosity of PTFE. One side of the membrane may be exposed to the process to be measured. An other side of the membrane, e.g. its backside, may be directed towards the reference electrode. Accordingly, ions—including poisoning ions—may migrate or permeate through the membrane towards the reference electrode. To prevent, or at least to reduce, the ions from permeating on a different path than through the membrane, the first junction comprises the sealed side of the membrane. The sealed side may comprise or consist of any material that is hard for the ions to penetrate. Such materials are often called "non-permeable material". One example material of the seal may be synthetic rubber, particularly fluorocarbon-based synthetic rubber, or another non-permeable material. In cases, where the membrane is arranged in a housing, the seal may comprise, for instance, an O-ring squeezed between the membrane and an inner wall of the housing and/or other elements the membrane is adjacent to. The O-ring may have a round, elliptic, rectangular, or an otherwise formed profile, possibly including a conical portion. The seal may comprise a plurality of O-rings. The seal may have elastic properties, at least at its outer regions, in order to improve the sealing effect.

One aspect may further include to provide a reference electrode, which is at least partly covered by a sleeve and/or sleeving. The sleeve may comprise or consist of plastic, thus insulating the reference electrode, and/or any material that protects the silver wire from the poisoning ions or at least reduces the number or penetrating poisoning ions. The sleeve or sleeving may protect the silver wire along its entire length, with exception of a small section at the Ag/AgCl junction.

By these means, the reference electrode system may encompass an improvement, in some cases a significant improvement, of its life time. Each of the components or features described above—let it be the sealed side or the sleeve—may effectively contribute to impeding the path of ions from the process to the reference element. Using both of these components does not only improve their "impeding potential", but makes the reference electrode system more robust and easy-to-handle. Particularly, the reference electrode system may by adapted and/or integrated to a plurality of measuring systems, which are designed for measuring a pH-value of a medium.

In various embodiments, the reference electrode system further comprises at least one second junction, comprising a connecting element that is, at least partly, surrounded by a rubber material, wherein the at least one second junction is arranged between the first junction and the reference electrode.

The connecting element may comprise or consist of any material that makes the path the poisoning ions have to take more strenuous. The connecting element may comprise or consist of wood, for instance. The connecting element may have a form of a dowel, a cylinder, a rectangular or otherwise formed cube, or another form, including tapered portions. The connecting element may be arranged in and surrounded by the rubber material, thus penetrating the rubber material in a way that the ions have only (or almost only) the possibility to migrate through the connecting element. In this aspect, the connecting element "connects" one side of the rubber material with another side, particularly with its backside.

The rubber material may be of any non-permeable material. The rubber material may have elastic properties, at least at regions that surround and/or are in contact with the connecting element, in order to have a kind of sealing effect. The sealing effect may be effective also in other contact regions of the rubber material, e.g. at an inner wall, when placed in a housing.

There could be one or more second junctions be provided between the first junction and the reference electrode. The number of second junctions may depend on the process to be measured, the geometry the reference electrode system is arranged or integrated in, and/or other factors.

The combination of the connecting element and the non-permeable rubber material may make the path the poisoning ions have to take more strenuous. The second junction further improves the reference electrode system, at least by prolonging its lifetime. The potential of arranging one or more second junctions may help to adapt the system to a broad range of requirements, for instance w.r.t. quality, geometry, and/or cost.

In some embodiments, when the reference electrode system comprises a plurality of second junctions, the connecting elements of the second junctions are arranged in a vertically displaced way, i.e. not in a row. This further impedes the path of the poisoning ions, thus making a further improved and/or cost-effective use of the plurality of second junctions.

In an embodiment, the connecting element comprises wood and/or is a wooden dowel. Using wood makes the manufacturing of the system simpler, because wood is easy to work with and/or easy to get.

In an embodiment, the rubber material comprises a fluorocarbon-based synthetic rubber, FKM, and/or consists of this material. An example trademark of FKM may be Viton. FKM, advantageously, has a high durability, for instance w.r.t. heat and/or chemical solutions. This further broadens the applicability of the reference electrode system.

In various embodiments, the membrane comprises polytetrafluoroethylene, PTFE, and/or consists of this material, and/or the reference electrode is a wire that comprises Ag/AgCl. Particularly, using an Ag/AgCl wire may ensure a high precision in determining a pH-value and/or may lead to a low response time of a pH-sensor system comprising the reference electrode system.

In various embodiments, the sealed side is arranged circumferentially at, at least, the sealed side of the membrane and comprises at least one of: an O-ring, a potting compound, and/or a layer of glue.

The O-ring may be arranged circumferentially, for instance around at, at least, the sealed side—e.g. at a side surface—of the membrane. And—if there is another opening, e.g. for a measuring electrode—the O-ring may also be arranged around the other opening. One aim is to prevent, or at least reduce, the ions from permeating on a different path than through the membrane. The O-ring may be arranged in a groove at the membrane's side surface, wherein the groove corresponds to the form of the O-ring. There may be more than one O-ring, and, in this case, there may be more than one groove, possibly also corresponding to the form of the O-rings. The O-ring may comprise or consist of a non-permeable material, for instance FKM.

The potting compound may be applied by coating the outside of the first junction, e.g. before inserting the membrane into the housing, for example, or another element, system and/or sensor enclosure the reference electrode system is designed to be embedded in. The potting compound may get its sealing effect after the manufacturing, for example when the potting compound sets.

The layer of glue may be applied between the membrane and the housing, for example (or another element or system). The glue may be selected primarily according to its sealing properties w.r.t. ions.

In various embodiments, the reference electrode and/or an electrically conducting wire is covered completely, with exception of an end portion of the reference electrode, by the sleeve. This advantageously keeps the reference electrode property of the electrically conducting wire, but further prolongs and impedes the path of poisonous ions.

In some embodiments, the sleeve comprises electrically insulating plastic and/or silicone, and/or consists of this material. As an alternative or additionally, any material that protects the silver wire from the poisoning chemicals would be suitable.

One further aspect relates to a pH-sensor system. The pH-sensor system comprises: A reference electrode system as described above and/or below, a sensor enclosure and/or housing, and a measuring electrode. A first junction of the reference electrode system comprises a sealed side, which is arranged between a membrane of the first junction and the sensor enclosure, and/or between the membrane and the measuring electrode, thus sealing a front-side of the membrane from a back-side of the membrane.

The front-side of the membrane may be directed to and/or in contact with a process or medium to be measured. The back-side of the membrane may be directed to an inner portion of the sensor enclosure and/or housing, thus advantageously separating the inner portion from the process. The sensor enclosure may be cylindrical or of a polygonal profile, e.g. rectangular or comprising another amount of edges. The measuring electrode may comprise chemically resistant pH-glass. This allows to protect the measuring electrode and/or the reference electrode against the medium and/or fluid that is measured by means of the pH-sensor system.

In various embodiments, the measuring electrode of a second junction of the reference electrode system is, at least partly, surrounded by a rubber material and/or the rubber material is, at least partly, surrounded by the sensor enclosure, thus sealing a first portion of the connecting element from a second, opposite, portion of the connecting element. Thus, the connecting element is arranged in a way that it penetrates the rubber material. In this aspect, the connecting element "connects" one side of the rubber material with another side, particularly with its backside. Furthermore, there is essentially no gap between the material and the sensor enclosure or housing. These measures—alone or combined—lead to the effect, that the ions have only (or almost only) the possibility to migrate through the connecting element, thus making the path for the poisoning ions more strenuous.

In some embodiments, the pH-sensor system further comprises a tube that is arranged, at least partly, around the reference electrode, the wire, and/or the sleeve, wherein the tube has a closed end nearby an end portion of the reference electrode. This not only contributes to a further impediment for the poisoning ions, but further protects the reference electrode and improves the quality of the system.

One further aspect relates to a method for manufacturing a pH-sensor system. The method comprises the steps of:

providing a sensor enclosure, wherein a first end of the sensor enclosure is open;

arranging a measuring electrode at least partly in the sensor enclosure, and connecting the measuring electrode to a first electrically conducting wire;

arranging a reference electrode at least partly in the sensor enclosure, and connecting the reference electrode to a second electrically conducting wire;

covering the reference electrode and/or the second electrically conducting wire completely, with exception of an end portion of the reference electrode, by means of a sleeve;

arranging, at or close to the first end, a first junction, comprising a membrane with a sealed side, thus sealing a front-side of the membrane from a back-side of the membrane.

In various embodiments, the method further comprises the step of:

before arranging the first junction, arranging, at least one a second junction in the sensor enclosure, wherein the at least one second junction comprises a connecting element that is, at least partly, surrounded by a rubber material, thus sealing a first portion of the connecting element from a second, opposite, portion of the connecting element.

One further aspect relates to a use of a reference electrode system and/or a pH-sensor system for pH-measurement.

The reference symbols used in the drawings, and their meanings, are listed in summary form in the list of reference symbols. In principle, identical parts are provided with the same reference symbols in the figures.

FIG. 1 schematically shows a sectional view of a pH-sensor system 10 according to an embodiment. The pH-sensor system 10 comprises a reference electrode system 12. The pH-sensor system 10 may measure a pH-value of a process or medium 15. For this, a sensor enclosure 20 or a sensor housing is at least at a first end 21 in contact with the process or medium 15. For instance, a measuring electrode 30—or a part of it, arranged close to the first end 21—may be in contact with the medium 15. A first junction 50 is arranged between a first chamber 25 of the sensor enclosure 20 and the medium 15. The first junction 50 may comprise a membrane 52. To (essentially) prevent poisoning ions to permeate through a potential gap, e.g. between an inner wall 24 of the sensor enclosure 20 and the membrane 52 a sealed side or seal 54 is arranged between the inner wall 24 and the membrane 52. If there is more than one potential gap in the membrane 52, more than one seal 54 may be arranged at the membrane 52. In an exemplary embodiment, there may be an opening 55 in the membrane 52, which is designed for holding the measuring electrode 30. In such an embodiment, a further seal 54 may be arranged between the membrane 52 and the measuring electrode 30. The opening 55 may be located in a central portion of the membrane 52 or at another portion of the membrane 52. The form of the opening 55 may influence the form and/or material of the sealed side 54. The sealed side 54 may comprise or consist of any material that is hard for the ions to penetrate. Such materials are often called as a "non-permeable material". One example material of the seal may be synthetic rubber or another non-permeable material. In cases, where the membrane is arranged in a housing 20, the seal may comprise, for instance, an O-ring, which is squeezed between the membrane 52 and the inner wall 24 of the housing 20 and/or other elements the membrane 52 is adjacent to. The O-ring may have a round, elliptic, rectangular, or an otherwise formed profile. The O-ring may have a counterpart, e.g. in form of a notch, in the membrane 52 and/or in the inner wall 24 of the housing 20. The seal may comprise a plurality of O-rings. Additionally or as an alternative, the sealed side or seal 54 may comprise or consist of a potting compound and/or a glue, particularly a layer of glue. The potting compound may get its sealing effect after the manufacturing, for example when the potting compound sets. The glue may be selected primarily according to its sealing properties w.r.t. ions. The sealed side or seal 54 may have elastic properties, at least at its outer regions, in order to improve the sealing effect. As a result, the sealed side 54 provides a high density for the ions and, therefore, forces the poisoning ions to migrate or permeate only (or almost only) through the membrane 52, e.g. towards a reference electrode. An example of an ions' path is depicted with reference sign 17.

The pH-sensor system 10 comprises a reference electrode 40. The reference electrode 40 is at least partly covered by a sleeve 44. The sleeve 44 may comprise or consist of plastic, thus insulating the reference electrode 40, and/or any material that protects the silver wire from the poisoning ions or at least reduces the number or penetrating poisoning ions. The sleeve or sleeving 44 may protect the silver wire along its entire length, with the exception of a small section, e.g. at an end portion 41, at the Ag/AgCl junction. The reference electrode 40 may be connected to an electric wire 42. The measuring electrode 30 may be connected to a further electric wire 32. The reference electrode 40 may further be surrounded by a tube 49, which is closed in the region of the end portion 41 and, as a consequence, further prolongs the exemplary ions' path 17.

The pH-sensor system 10 further comprises a second junction 60. The second junction 60 is arranged between the first junction 50 and the reference electrode 40. There may more than one second junction 60 be arranged between the first junction 50 and the reference electrode 40. There may be embodiments without a second junction 60. The second junction 60 shown comprises a connecting element 64 that is, at least partly, surrounded by a rubber material 62. The connecting element 64 may comprise or consist of any material that makes the path the poisoning chemical has to take more strenuous. The connecting element 64 may comprise or consist of wood, for instance. The connecting element may have a form of a dowel, a cylinder, a rectangular or otherwise formed cube, or of another form, including tapered parts. The connecting element 64 is arranged in and/or surrounded by the rubber material 62, thus penetrating the rubber material 62 in a way that the ions have only (or almost only) the possibility to migrate through the connecting element 64. According to this aspect, the connecting element 64 "connects" one side of the rubber material, e.g. the side towards the first chamber 25, with another side, particularly with its backside, e.g. towards a second chamber 26. The rubber material 62 has a sealing effect between the first chamber 25 and the second chamber 26, thus forcing the ions to migrate (almost) only through the connecting element 64. The rubber material 62 may include a sealing effect w.r.t. the measuring electrode 30.

The resulting exemplary ions' path 17 is depicted schematically. It is shown clearly that the pH-sensor system 10 is designed in a way—by means of the sealing elements 54 and 62—that the ions do not take a path other than through the membrane 52 and the connecting element 64. At least by this, the ions' path 17 is effectively prolonged and more strenuous for the poisoning ions, resulting in a longer lifetime of the system.

Figure 2:
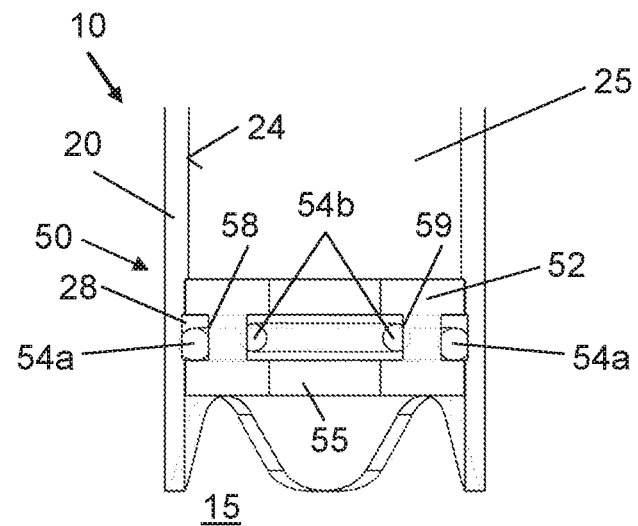
FIG. 2 schematically shows a sectional view of a part of a pH-sensor system according to an embodiment.

FIG. 2 schematically shows a sectional view of a part of a pH-sensor system 10 according to an embodiment. The part shown here comprises a first junction 50, arranged between a process or medium 15 and a first chamber 25 of the pH-sensor system 10. The first junction 50 comprises a membrane 52, which is arranged in a sensor enclosure 20. Between an inner wall 24 of the sensor enclosure 20 and the membrane 52, a seal 54a is arranged, thus sealing the membrane's side towards the medium 15 from its side towards the first chamber 25. The seal 54a shown is formed as an O-ring. To further support the sealing effect, notches 28 and 58 are formed in inner wall 24 and the membrane 52, respectively, which correspond to the O-ring 54a.

The part of a pH-sensor system 10, which is shown here, further depicts an opening 55 for a measuring electrode 30. There is a further seal 54b arranged between the measuring electrode 30 and the membrane 52. There may be notches 59 formed in the membrane 52 and possibly in the measuring electrode 30, which correspond to the O-ring.

Figure 3:
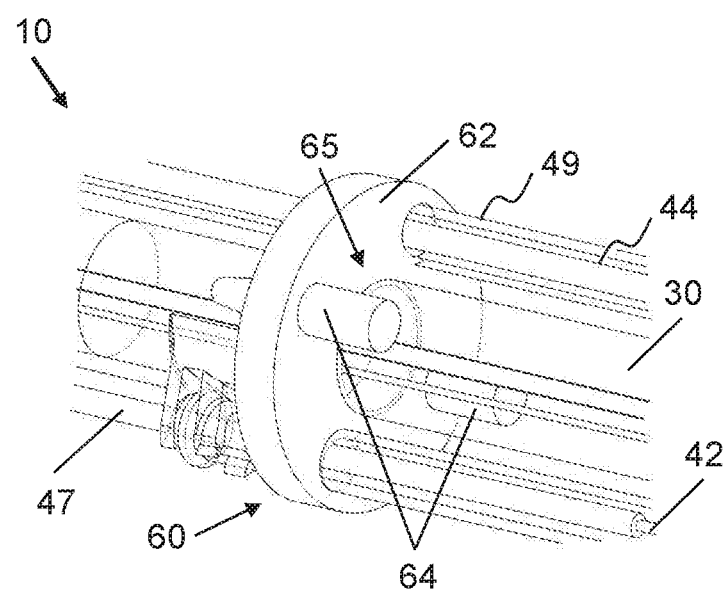
FIG. 3 schematically shows a sectional view of a further part of a pH-sensor system according to an embodiment.

FIG. 3 schematically shows a sectional view of a further part of a pH-sensor system 10 according to an embodiment. The part shown here comprises a second junction 60. The second junction 60 comprises a rubber material 62, which surrounds two connecting elements 64. The exemplary connecting element 64 is formed as a cylinder with a conical portion. Furthermore, a measuring electrode 30 is arranged in a central opening 65 of the rubber material 62. Furthermore, a wire 42 is shown, surrounded by a sleeve 44 and leading to a reference electrode 40. The wire 42 is arranged in a tube 49. Due to its elastic property, the rubber material 62 seals all the openings of the rubber material 62. The pH-sensor system 10 may further comprise a temperature-dependent resistor 47, which may be designed to compensate a temperature-dependence of the reference electrode 40.

Figure 4:
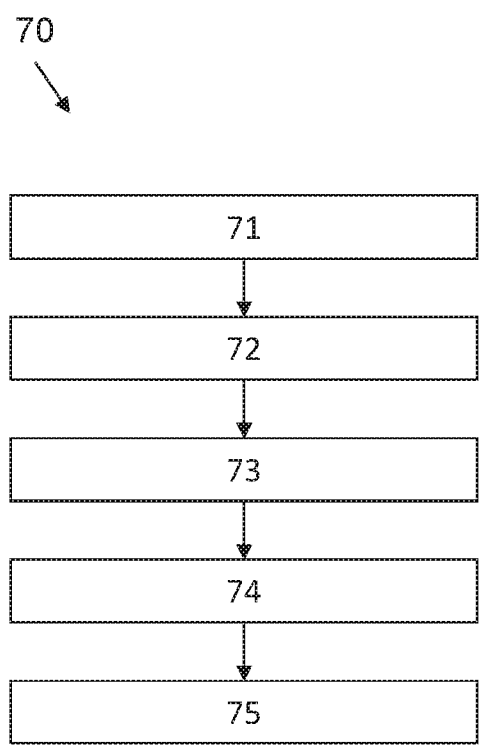
FIG. 4 shows a method of manufacturing a pH-sensor system according to an embodiment.

FIG. 4 shows a flow diagram 70 method of manufacturing a pH-sensor system 10 according to an embodiment. In a step 71, a sensor enclosure 20 (see FIG. 1) is provided. A first end 21 of the sensor enclosure 20 is open. In a step 72, a measuring electrode 30 is arranged, at least partly, in the sensor enclosure 20. The measuring electrode 30 is connected to a first electrically conducting wire 32. In a step 73, a reference electrode 40 is arranged, at least partly, in the sensor enclosure 20. The reference electrode 40 is connected to a second electrically conducting wire 42. In a step 74, the reference electrode 40 and/or the second electrically conducting wire 42 is covered completely, with exception of an end portion 41 of the reference electrode 40, by means of a sleeve 44. In a step 75, a first junction 50 is arranged in the sensor enclosure 20. The first junction 50 comprises a membrane 52 with a sealed side 54, thus sealing a front-side of the membrane 52 from a back-side of the membrane 52.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 pH-sensor system
12 electrode system
15 medium
17 ions' path
20 sensor enclosure, housing
21 first end of the sensor enclosure
24 inner wall of the sensor enclosure
25 first chamber of the sensor enclosure
26 second chamber of the sensor enclosure
28 notch
30 measuring electrode
32 first electrically conducting wire
40 reference electrode
41 end portion
42 second electrically conducting wire
44 sleeve, sleeving
47 temperature-dependent resistor
49 tube
50 first junction
52 membrane
54 seal, sealed side, sealing element(s)
54a, 54b O-ring, seal
55 opening
58, 59 notches
60 second junction
62 rubber material
64 connecting element
65 central opening
70 flow diagram
71-75 steps

What is claimed is:

1. A reference electrode system for a pH-sensor system, the reference electrode system comprising:
   a first junction comprising a membrane with a sealed side;
   a reference electrode, comprising a top end portion and a bottom end portion, wherein the reference electrode and/or an electrically conducting wire of the reference electrode is covered completely, except for the bottom end portion of the reference electrode, by a sleeve and wherein the top end portion and/or the electrically conducting wire protrudes from the sleeve; and
   a tube, having an open top end portion and a closed bottom end, the tube being arranged, at least partly, around the reference electrode, the electrically conducting wire, and the sleeve, the closed bottom end of the tube being arranged near the end of the bottom portion of the reference electrode;
   wherein the closed end of the tube prevents ions from penetrating therethrough.

2. The reference electrode system of claim 1, further comprising:
   at least one second junction comprising a connecting element that is, at least partly, surrounded by a rubber material,
   wherein the at least one second junction is arranged between the first junction and the reference electrode.

3. The reference electrode system of claim 2, wherein, when the reference electrode system comprises a plurality of second junctions, connecting elements thereof are arranged so as to be vertically displaced.

4. The reference electrode system of claim 3, wherein each connecting element comprises wood and/or is a wooden dowel.

5. The reference electrode system of claim 2, wherein the rubber material comprises a fluorocarbon-based synthetic rubber.

6. The reference electrode system of claim 1, wherein the membrane comprises polytetrafluoroethylene or PTFE, and/or
   wherein the reference electrode is a wire that comprises Ag/AgCl.

7. The reference electrode system of claim 1, wherein the sealed side is arranged circumferentially at, at least, the sealed side of the membrane and comprises at least one of:
   an O-ring, a potting compound, and/or a layer of glue.

8. The reference electrode system of claim 1, wherein the sleeve comprises electrically insulating plastic and/or silicone.

9. A pH-sensor system, comprising:
   the reference electrode system of claim 1;
   a sensor enclosure; and
   a measuring electrode,
   wherein a sealed side of a first junction of the reference electrode system is arranged between a membrane of the first junction and the sensor enclosure, and/or between the membrane and the measuring electrode so as to seal a front-side of the membrane from a back-side of the membrane.

10. A method for manufacturing a pH-sensor system, the method comprising the steps of:
    providing a sensor enclosure, a first end of the sensor enclosure being open;
    arranging a measuring electrode at least partly in the sensor enclosure and connecting the measuring electrode to a first electrically conducting wire;
    arranging a reference electrode, comprising a top end portion and a bottom end portion, at least partly in the sensor enclosure and connecting the reference electrode to a second electrically conducting wire;
    covering the reference electrode and/or the second electrically conducting wire completely, except for the bottom end portion of the reference electrode, by a sleeve and wherein the top end portion and/or the electrically conducting wire protrudes from the sleeve;
    arranging a tube, having an open top end portion and a closed bottom end, the tube being arranged, at least partly, around the reference electrode, the wire, and the sleeve, the closed bottom end of the tube being arranged near the end of the bottom portion of the reference electrode, wherein the closed end of the tube prevents ions from penetrating therethrough; and
    arranging, at or close to the first end, a first junction comprising a membrane with a sealed side so as to seal a front-side of the membrane from a back-side of the membrane.

11. The method of claim 10, further comprising the step of:
    before arranging the first junction, arranging, at least one second junction in the sensor enclosure,
    wherein the at least one second junction comprises a connecting element that is, at least partly, surrounded by a rubber material so as to seal a first portion of the connecting element from a second, opposite, portion of the connecting element.

* * * * *